(12) United States Patent
Schreiber et al.

(10) Patent No.: US 10,836,277 B2
(45) Date of Patent: Nov. 17, 2020

(54) SYSTEM AND METHOD FOR SUPPLYING HEAT TO AN EXHAUST GAS AFTER-TREATMENT SYSTEM OF A PLUG-IN HYBRID ELECTRIC VEHICLE

(71) Applicants: Hyundai Motor Company, Seoul (KR); Kia Motors Corporation, Seoul (KR)

(72) Inventors: Michael Schreiber, Frankfurt am Main (DE); Ingmar Langer, Darmstadt (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/188,335

(22) Filed: Nov. 13, 2018

(65) Prior Publication Data
US 2020/0070668 A1 Mar. 5, 2020

(30) Foreign Application Priority Data
Aug. 30, 2018 (DE) .......................... 10 2018 214756

(51) Int. Cl.
| | |
|---|---|
| *B60K 6/22* | (2007.10) |
| *F01N 3/20* | (2006.01) |
| *B60L 58/26* | (2019.01) |
| *B60L 53/12* | (2019.01) |
| *B60L 58/12* | (2019.01) |

(52) U.S. Cl.
CPC .............. *B60L 58/26* (2019.02); *B60K 6/22* (2013.01); *B60L 53/12* (2019.02); *B60L 58/12* (2019.02); *F01N 3/2013* (2013.01); *B60L 2240/36* (2013.01); *B60L 2240/545* (2013.01); *B60Y 2200/92* (2013.01); *B60Y 2300/91* (2013.01)

(58) Field of Classification Search
CPC .......... B60L 58/26; B60L 58/12; B60L 53/12; B60L 2240/36; B60L 2240/545; B60K 6/22; B60Y 2200/92; B60Y 2300/91; F01N 3/2013
USPC ............................ 180/68.1, 68.2, 68.3, 309
See application file for complete search history.

(56) References Cited

U.S. PATENT DOCUMENTS

| | | | | |
|---|---|---|---|---|
| 6,112,519 | A * | 9/2000 | Shimasaki | F01N 3/2882 60/300 |
| 7,028,793 | B2 * | 4/2006 | Hu | B60L 50/16 180/65.25 |
| 9,849,796 | B2 * | 12/2017 | Herriot | H02J 50/80 |
| 2016/0155922 | A1 * | 6/2016 | Lang | H01L 35/22 320/162 |

FOREIGN PATENT DOCUMENTS

EP 2 661 378 B1 11/2014

\* cited by examiner

*Primary Examiner* — John D Walters
(74) *Attorney, Agent, or Firm* — Mintz Levin Cohn Ferris Glovsky and Popeo, P.C.; Peter F. Corless

(57) ABSTRACT

A system for supplying heat to an exhaust gas after-treatment system of a plug-in hybrid electric vehicle is provided. The system includes a heat transfer device that transfers heat generated by at least one component of an electric system of the plug-in hybrid electric vehicle to the exhaust gas after-treatment system of the plug-in hybrid electric vehicle.

16 Claims, 9 Drawing Sheets

SYSTEM AND METHOD FOR SUPPLYING HEAT TO AN EXHAUST GAS AFTER-TREATMENT SYSTEM OF A PLUG-IN HYBRID ELECTRIC VEHICLE

CROSS REFERENCE TO RELATED APPLICATION(S)

This application is based on and claims priority to German Application No. 102018214756.6, filed on Aug. 30, 2018, the disclosure of which is incorporated herein by its entirety by reference.

BACKGROUND

Field of the Invention

The present invention relates to a system and method for supplying heat to an exhaust gas after-treatment system of a plug-in hybrid electric vehicle.

Description of the Prior Art

Emission legislations for vehicles having an internal combustion engine are becoming more challenging each year. Plug-in hybrid electric vehicles are a suitable bridge technology from the combustion engine to a battery electric vehicle. With plug-in hybrid electric vehicles, the combustion system is only rarely used and thus an after-treatment system for the combustion engine usually does not reach an optimal operating temperature. It is, however, necessary to reach an optimal operating temperature of the after-treatment system to optimize emissions from the combustion engine.

A method of the related art regulates the temperature of a part of an automotive vehicle comprising an inductive system for charging an electric battery. The inductive charging system includes a coil that allows magnetic energy to be converted into electrical energy for charging the battery. The method also uses the heat energy produced in the coil through the Joule effect to heat a part of the motor vehicle, notably a motor vehicle interior. Consequently, there is a need to further improve an exhaust gas after-treatment system of a plug-in hybrid electric vehicle to operate at an optimal operating temperature.

SUMMARY

The present invention relates to a system and method for supplying heat to an exhaust gas after-treatment system of a plug-in hybrid electric vehicle in accordance.

An aspect of the present invention relates to a system for supplying heat to an exhaust gas after-treatment system of a plug-in hybrid electric vehicle. The system may include a heat transfer device configured to transfer heat generated by at least one component of an electric system of the plug-in hybrid electric vehicle to the exhaust gas after-treatment system of the plug-in hybrid electric vehicle. The heat transfer device is formed by a convection heat transfer device, in particular a heat exchanger, or by a conduction heat transfer device. The system may further include controller configured to operate the heat transfer device.

A further aspect of the present invention relates to a method for supplying heat to an exhaust gas after-treatment system of a plug-in hybrid electric vehicle. The method may include transferring heat generated by at least one component of an electric system of the plug-in hybrid electric vehicle to the exhaust gas after-treatment system of the plug-in hybrid electric vehicle by a heat transfer device. The heat transfer device may be a convection heat transfer device, in particular a heat exchanger or a conduction heat transfer device. The method may further including operating, by a controller, the heat transfer device.

The idea of the present invention is to provide a system for supplying heat to an exhaust gas after-treatment system of a plug-in hybrid electric vehicle which uses the waste heat of the electric system to heat the after-treatment system of the plug-in hybrid electric vehicle. Accordingly, the exhaust gas after-treatment system may be effectively pre-heated to a predetermined temperature either before use or during use of the plug-in hybrid electric vehicle to more rapidly reach an optimal operating temperature of the exhaust gas after-treatment system.

In the conduction method, heat may be transferred via a direct contact of the electric system and the after-treatment system. According to the convection method, heat may be transferred by device of a heat exchanger from the at least one component of the electric system to the exhaust gas after-treatment system of the plug-in hybrid electric vehicle. In the electric system, heat may be generated, for example, when charging or discharging a traction battery as the traction battery generates heat. Furthermore, other components of the electric system may also generate heat such as an inverter, an electric machine and/or a charging system.

According to an exemplary embodiment, the electric system may include a traction battery, an inverter, at least one electric machine and a charging system, in particular an inductive charging system having an inductive coil. Each of these components generates heat during operation such as charging and discharging the traction battery of the plug-in hybrid electric vehicle. The heat generated by those components is advantageously usable to pre-heat the exhaust gas after-treatment system by the heat transfer device.

Additionally, the heat transfer device may be configured to transfer heat generated by the at least one component of the electric system of the plug-in hybrid electric vehicle during charging or discharging the traction battery of the plug-in hybrid electric vehicle to the exhaust gas after-treatment system of the plug-in hybrid electric vehicle. The waste heat generated by the at least one component of the electric system may thus advantageously be used to pre-heat the exhaust gas after-treatment system of the plug-in hybrid electric vehicle before or during use of the vehicle.

According to a further exemplary embodiment, a first circuit of the convection heat transfer device, in particular the heat exchanger, containing a first fluid may be configured to absorb heat from the at least one component of the electric system of the plug-in hybrid electric vehicle. A second circuit of the heat exchanger containing a second fluid may be configured to absorb heat from the first circuit and transfer the heat to the exhaust gas after-treatment system of the plug-in hybrid electric vehicle.

Accordingly, a suitable heat exchanger may be selected that allows for an optimal heat transfer from the first circuit to the second circuit. In addition, the convection heat transfer device, in particular the heat exchanger, may be configured to transfer heat generated by the traction battery during charging or discharging of the traction battery and transfer heat generated by the inverter and the at least one electric machine during discharging of the traction battery, in particular during power output of the traction battery to the inverter to drive the at least one electric machine. Therefore, the waste heat generated by a plurality of components of the electric system may be used to pre-heat the exhaust gas after-treatment system of the plug-in hybrid electric vehicle.

The convection heat transfer device, in particular the heat exchanger, may be to transfer heat generated by the charging system, in particular the inductive charging system including an inductive coil, during charging of the traction battery. The heat generated by the inductive charging system, in particular the inductive coil mounted in the vehicle may thus advantageously be used to pre-heat the exhaust gas after-treatment system of the plug-in hybrid electric vehicle.

According to a further exemplary embodiment, the conduction heat transfer device may be disposed proximate to or abutting the traction battery and may be configured to transfer heat by device of conduction during charging or discharging of the traction battery and transfer heat by device of conduction generated by the inverter and the at least one electric machine during discharging of the traction battery, in particular during power output of the traction battery to the inverter to drive the at least one electric machine. Thus, the heat dissipated by the traction battery, the inverter and the at least one electric machine may be advantageously used to pre-heat the exhaust gas after-treatment system of the plug-in hybrid electric vehicle.

Furthermore, the conduction heat transfer device may be disposed proximate to or abutting the charging system, in particular the inductive charging system including an inductive coil, and may be configured to transfer heat by device of conduction generated by the charging system, in particular the inductive charging system including the inductive coil, during charging of the traction battery. The heat generated by the inductive charging system, in particular the inductive coil mounted in the vehicle may thus advantageously be used to pre-heat the exhaust gas after-treatment system of the plug-in hybrid electric vehicle.

In response to determining that the plug-in hybrid electric vehicle is plugged into the grid and if a user will use the vehicle within a predetermined period of time, particularly within about 30 to 60 minutes, the controller may be configured to initiate or continue charging and activate the heat transfer device. If a usage of the vehicle by the user may be estimated within the predetermined period of time then the exhaust gas after-treatment system may be pre-heated using the waste heat dissipated by the traction battery during charging.

Additionally, in response to determining that the plug-in hybrid electric vehicle is plugged into the grid and that a user will not use the vehicle within a predetermined period of time, particularly within about 30 to 60 minutes, the controller may be configured to detect a charge level of a traction battery and determine whether a state of charge of the traction battery exceeds a predetermined threshold value, such as about 50. When the state of charge of the traction battery exceeds the predetermined threshold value, the controller may be configured to suspend charging of the traction battery until it is determined that the user will use the vehicle within the predetermined period of time. The traction battery may thus be charged up to a particular level and then continue to be charged when usage of the vehicle may be estimated within the predetermined period of time to use the advantageous effect of being able to pre-heat the exhaust gas after-treatment system using the waste heat generated by the traction battery during charging.

In response to determining that the plug-in hybrid electric vehicle is driven by at least one electric machine only, the controller may be configured to activate the heat transfer device. When the vehicle is driven by the electric machine only, the internal combustion engine is consequently currently not used and thus, the exhaust gas after-treatment system will cool down during use of the electric machine. This effect may be advantageously counteracted by using the waste heat generated by the electric machine to supply heat to the exhaust gas after-treatment system during use of the electric machine.

According to another exemplary embodiment, in response to determining that a traction battery of the plug-in hybrid electric vehicle is charged by operating at least one electric machine as a generator, the controller may be configured to activate the heat transfer device. When the vehicle is decelerated by regenerative breaking, the waste heat generated by the electric machine may advantageously be used to supply heat to the exhaust gas after-treatment system.

The controller may be configured to set a timer to initiate charging a traction battery to complete charging of the traction battery when the user is estimated to use the plug-in hybrid electric vehicle. Accordingly, the exhaust gas after-treatment system may advantageously be pre-heated to heat the system to a predetermined temperature at the time when the user intends to use the vehicle. The controller may further be configured to estimate a point in time when the user will use the plug-in hybrid electric vehicle based on usage pattern data recorded in a vehicle storage unit or a cloud storage unit. A previous usage pattern of the vehicle by the driver or multiple drivers may thus be advantageously used to more accurately estimate a point in time of expected usage of the vehicle by the driver or drivers.

The herein described features of the system for supplying heat to an exhaust gas after-treatment system of a plug-in hybrid electric vehicle are also disclosed in the method for supplying heat to an exhaust gas after-treatment system of a plug-in hybrid electric vehicle and vice versa.

BRIEF DESCRIPTION OF THE FIGURES

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

Unless indicated otherwise, like reference numerals or signs to the figures indicate like elements.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
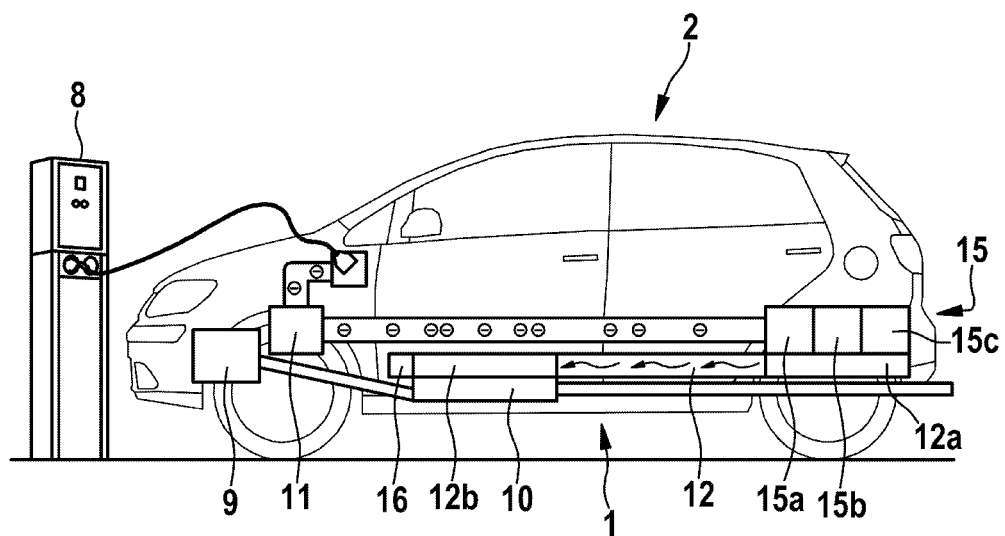
FIG. 1 shows a schematic view of a system for supplying heat to an exhaust gas after-treatment system of a plug-in hybrid electric vehicle according to a first exemplary embodiment of the invention.

FIG. 1 shows a schematic view of a system for supplying heat to an exhaust gas after-treatment system of a plug-in hybrid electric vehicle according to a first exemplary embodiment of the invention.

The system 1 for supplying heat to the exhaust gas after-treatment system 10 of the plug-in hybrid electric vehicle 2 is installed in the plug-in hybrid electric vehicle 2. The system 1 may include a heat transfer device 12 and controller 16. The heat transfer device 12 may be configured to transfer heat generated by at least one component 15a, 15b, 15c, 17 of an electric system 15 of the plug-in hybrid electric vehicle to the exhaust gas after-treatment system 10 of the plug-in hybrid electric vehicle 2. The heat transfer device 12 may be formed by a convection heat transfer device 12, in particular a heat exchanger. The controller 16 may be configured to operate the heat transfer device 12 and may be formed as an electronic control unit. The electronic control unit may be a standalone electronic control unit. Alternatively, the controller may be integrated in another existing electronic unit such as an energy management system of the vehicle 2.

The electric system 15 may further include a traction battery 15a, an inverter 15b, at least one electric machine 15c disposed at the rear axle of the vehicle 2 and a charging system 17, in particular an inductive charging system 17 including a first inductive coil 15d disposed within the vehicle and a second inductive coil 15e disposed in the ground at a parking space of the vehicle. Notably, the components 15a, 15b, 15c of the electric system 15 are depicted merely schematically, wherein an outer form and/or a position within the vehicle may differ from an actual implementation. The depiction shown is intended to simplify an understanding of the invention.

The heat transfer device 12 may be configured to transfer heat generated by the at least one component 15a, 15b, 15c of the electric system 15 of the plug-in hybrid electric vehicle during charging or discharging the traction battery 15a of the plug-in hybrid electric vehicle 2 to the exhaust gas after-treatment system 10 of the plug-in hybrid electric vehicle 2. A first circuit 12a of the convection heat transfer device 12, in particular the heat exchanger, containing a first fluid may be configured to absorb heat from the at least one component 15a, 15b, 15c of the electric system 15 of the plug-in hybrid electric vehicle 2. A second circuit 12b of the heat exchanger containing a second fluid may be configured to absorb heat from the first circuit 12a and transfer the heat to the exhaust gas after-treatment system 10 of the plug-in hybrid electric vehicle 2.

Furthermore, the convection heat transfer device 12, in particular the heat exchanger, may be configured to transfer heat generated by the traction battery 15a during charging or discharging of the traction battery 15a and transfer heat generated by the inverter 15b and the at least one electric machine 15c during discharging of the traction battery 15a, in particular during power output of the traction battery 15a to the inverter 15b to drive the at least one electric machine 15c. The plug-in hybrid electric vehicle 2 as shown in the figure, is plugged into a charging station 8 for charging the traction battery 15a. The vehicle 2 may further include an energy management system 11 configured to manage the energy supplied to and supplied from the traction battery 15a of the electric system 15. In addition, the vehicle 2 may include an internal combustion engine 9 configured to generate exhaust gas to the exhaust gas after-treatment system 10.

Figure 2:
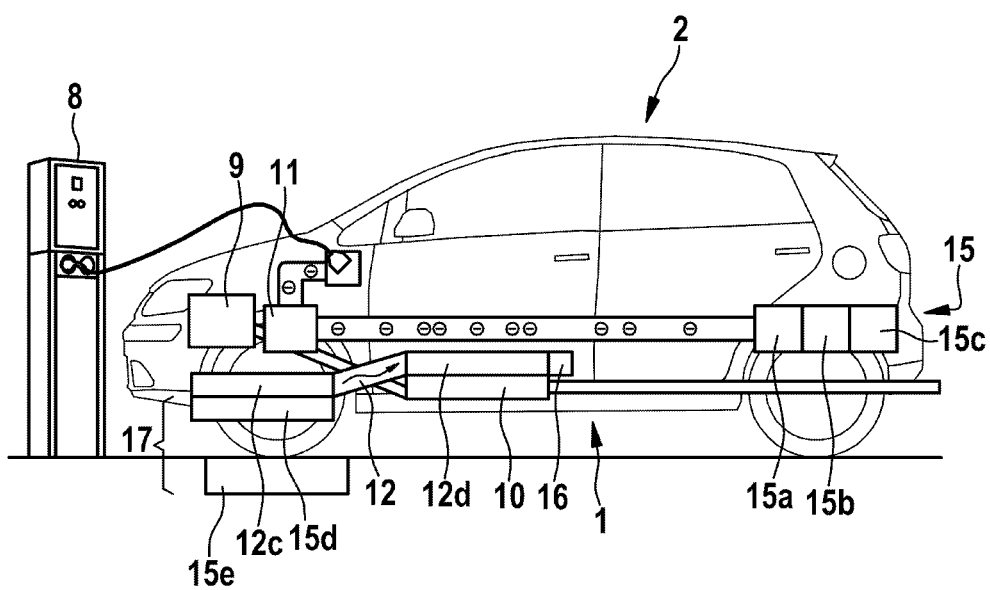
FIG. 2 shows a schematic view of the system for supplying heat to the exhaust gas after-treatment system of the plug-in hybrid electric vehicle according to a second exemplary embodiment of the invention.

FIG. 2 shows a schematic view of the system for supplying heat to the exhaust gas after-treatment system of the plug-in hybrid electric vehicle according to a second exemplary embodiment of the invention. According to the second exemplary embodiment, the convection heat transfer device 12, in particular the heat exchanger, may be configured to transfer heat generated by the charging system 17, in particular the inductive charging system 17 including a first inductive coil 15d disposed within the vehicle and a second inductive coil 15e disposed within the ground at a parking space of the vehicle, during charging of the traction battery 15a.

Figure 3:
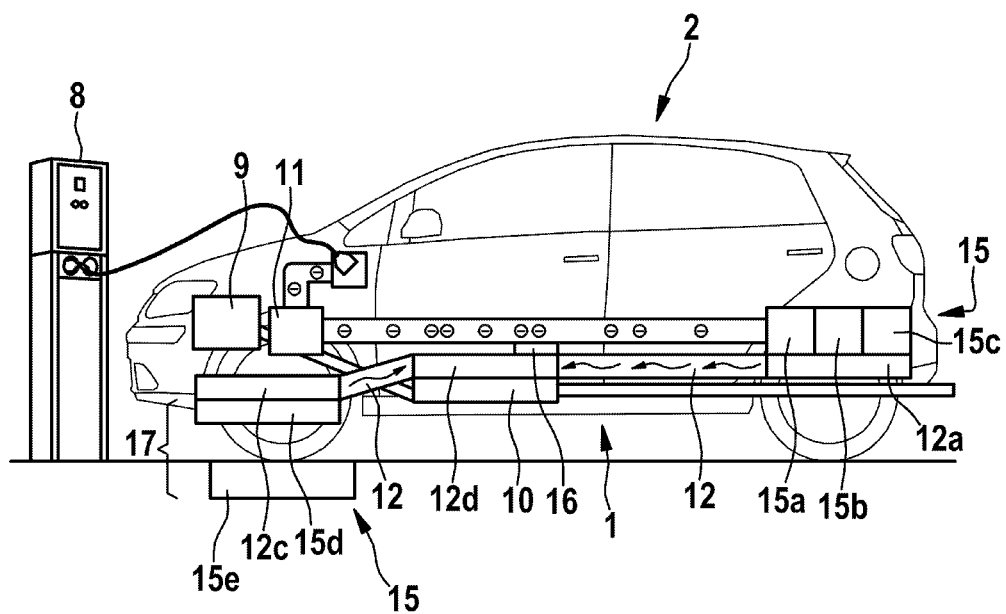
FIG. 3 shows a schematic view of the system for supplying heat to the exhaust gas after-treatment system of the plug-in hybrid electric vehicle according to a third exemplary embodiment of the invention.

FIG. 3 shows a schematic view of the system for supplying heat to the exhaust gas after-treatment system of the plug-in hybrid electric vehicle according to a third exemplary embodiment of the invention. According to the third exemplary embodiment, the convection heat transfer device 12, in particular the heat exchanger, may be configured to absorb heat from at least one of the traction battery 15a, the inverter 15b and the at least one electric machine 15c as well as from the charging system 17, in particular the inductive charging system 17 include a first inductive coil 15d disposed within the vehicle and a second inductive coil 15e disposed within the ground at a parking space of the vehicle.

Figure 4:
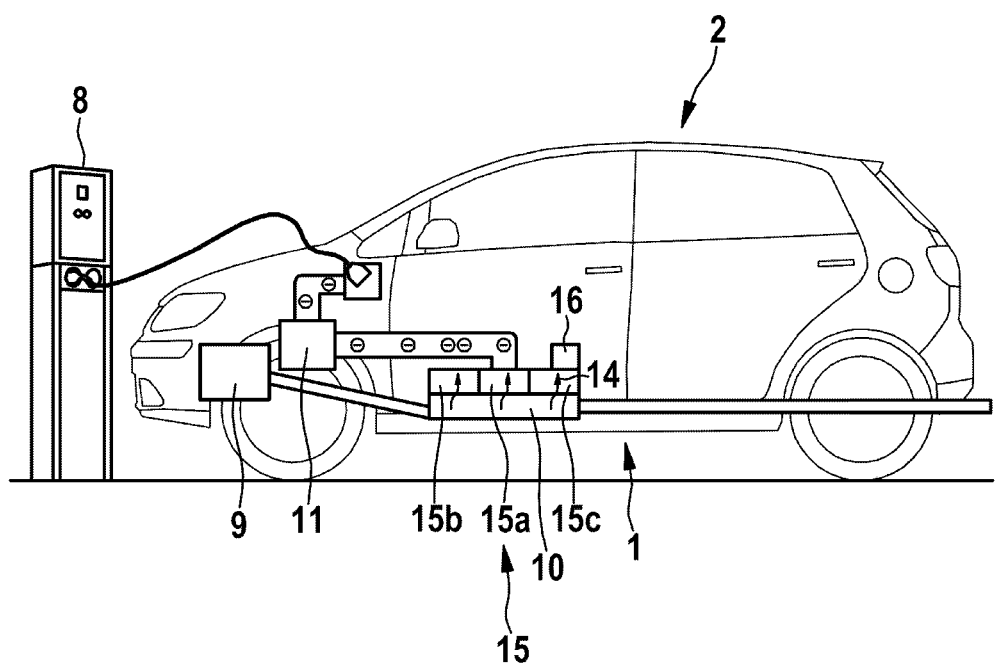
FIG. 4 shows a schematic view of the system for supplying heat to the exhaust gas after-treatment system of the plug-in hybrid electric vehicle according to a fourth exemplary embodiment of the invention.

FIG. 4 shows a fourth exemplary embodiment of the invention according to which the heat transfer device is formed as a conduction heat transfer device 14 disposed proximate to the traction battery 15a and configured to transfer heat by device of conduction during charging or discharging of the traction battery 15a. Alternatively, the conduction heat transfer device 14 may be disposed to abut the traction battery 15a. The conduction heat transfer device 14 may be configured to transfer heat by device of conduction generated by the inverter 15b and the at least one electric machine 15c during discharging of the traction battery 15a, in particular during power output of the traction battery 15a to the inverter 15b to drive the at least one electric machine 15c.

Notably, as mentioned with respect to the first exemplary embodiment, the components of the electric system 15, such as, the traction battery 15a, the inverter 15b and the at least one electric machine 15c are according to the present exemplary embodiment depicted in a mid-section of the vehicle 2. This depiction is merely of exemplary nature, wherein the actual positioning of the components may vary. For instance, the electric machine may be arranged at a front axle or rear axle or at both front and rear axles of the vehicle. Similarly, the exhaust gas after-treatment system may be arranged at a different position closer to the front axle or rear axle of the vehicle. Moreover, the traction battery 15a and the inverter 15b may also be arranged in a different position based on the position of the exhaust gas after-treatment system 10.

Figure 5:
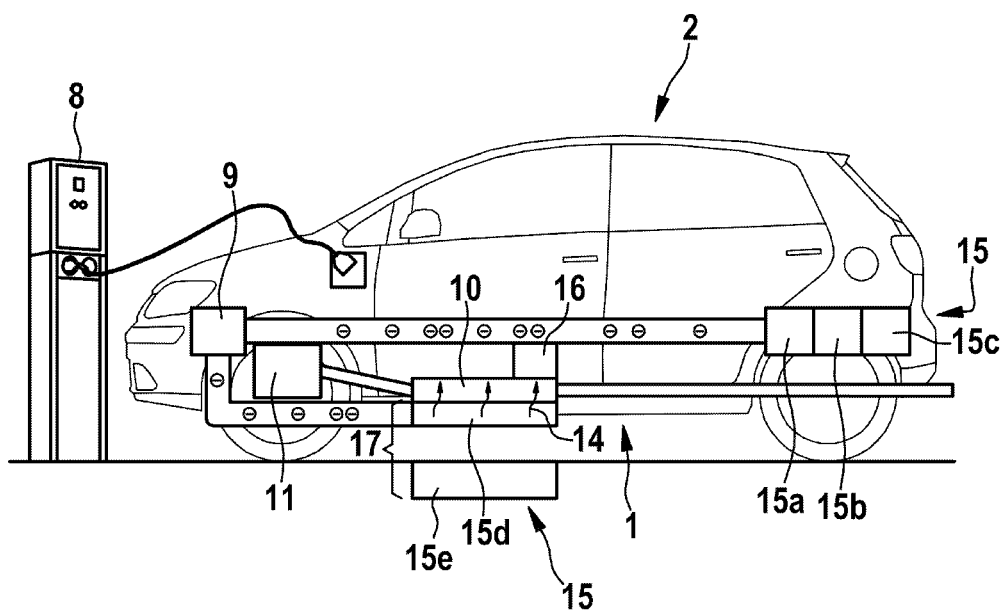
FIG. 5 shows a schematic view of the system for supplying heat to the exhaust gas after-treatment system of the plug-in hybrid electric vehicle according to a fifth exemplary embodiment of the invention.

FIG. 5 shows a schematic view of the system for supplying heat to the exhaust gas after-treatment system of the plug-in hybrid electric vehicle according to a fifth exemplary embodiment of the invention. According to the fifth exemplary embodiment of the invention, the conduction heat transfer device 14 may be disposed proximate to the charging system 17, in particular the inductive charging system 17 including a first inductive coil 15d disposed within the vehicle and a second inductive coil 15e disposed within the ground at a parking space of the vehicle 2. The conduction heat transfer device 14 may be advantageously configured to transfer heat by device of conduction generated by the charging system 17, in particular the inductive charging system 17 including the first inductive coil 15d disposed within the vehicle during charging of the traction battery 15a. Alternatively, the conduction heat transfer device 14 may be disposed in direct contact with (e.g., abutting) the charging system 17.

Figure 6:
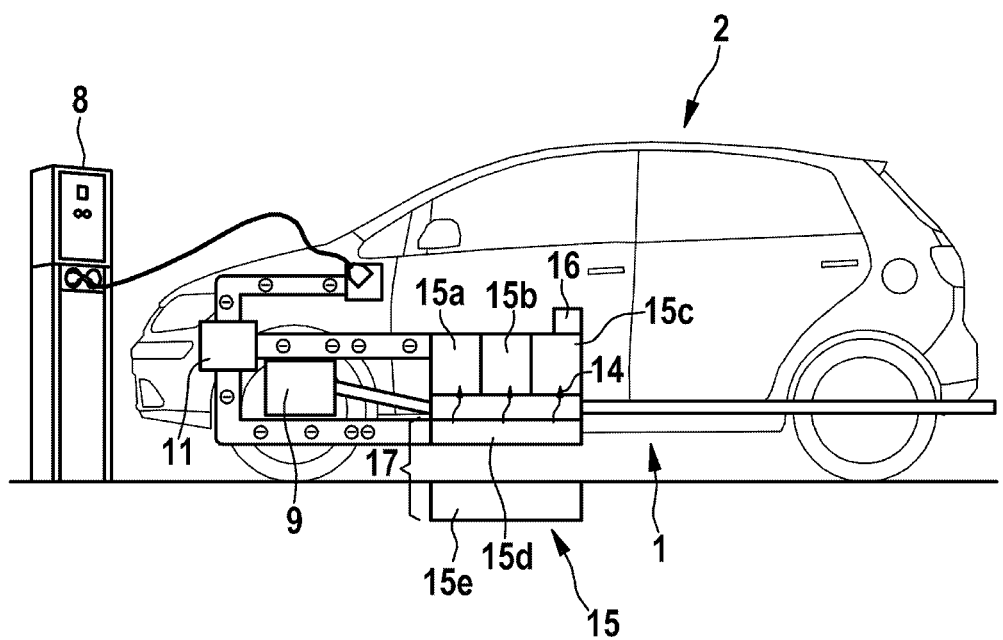
FIG. 6 shows a schematic view of the system for supplying heat to the exhaust gas after-treatment system of the plug-in hybrid electric vehicle according to a sixth exemplary embodiment of the invention.

FIG. 6 shows a schematic view of the system for supplying heat to the exhaust gas after-treatment system of the plug-in hybrid electric vehicle according to a sixth exemplary embodiment of the invention. According to the sixth exemplary embodiment, the conduction heat transfer device 14 may be configured to absorb heat from at least one of the traction battery 15a, the inverter 15b and the at least one electric machine 15c as well as from the charging system 17, in particular the inductive charging system 17 including a first inductive coil 15d disposed within the vehicle and a second inductive coil 15e disposed within the ground at a parking space of the vehicle.

Figure 7:
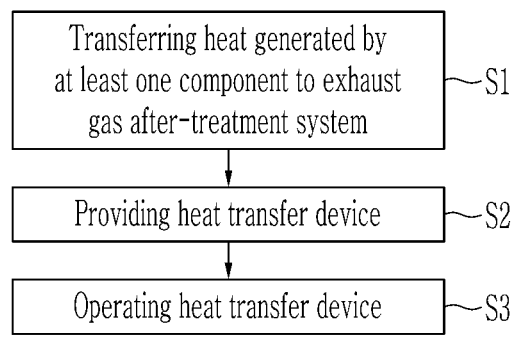
FIG. 7 shows a flowchart of a method for supplying heat to an exhaust gas after-treatment system of the plug-in hybrid electric vehicle according to the exemplary embodiments of the invention.

FIG. 7 shows a flowchart of a method for supplying heat to an exhaust gas after-treatment system of the plug-in hybrid electric vehicle according to the exemplary embodiments of the invention. The method may include transferring heat S1 generated by at least one component 15a, 15b, 15c, 17 of an electric system 15 of the plug-in hybrid electric vehicle 2 to the exhaust gas after-treatment system 10 of the plug-in hybrid electric vehicle 2 by a heat transfer device 12; 14. The heat transfer device 12; 14 is provided S2 by a convection heat transfer device 12, in particular a heat exchanger, or by a conduction heat transfer device 14. The method may further including operating S3 the heat transfer device 12; 14 by a controller 16.

Figure 8:
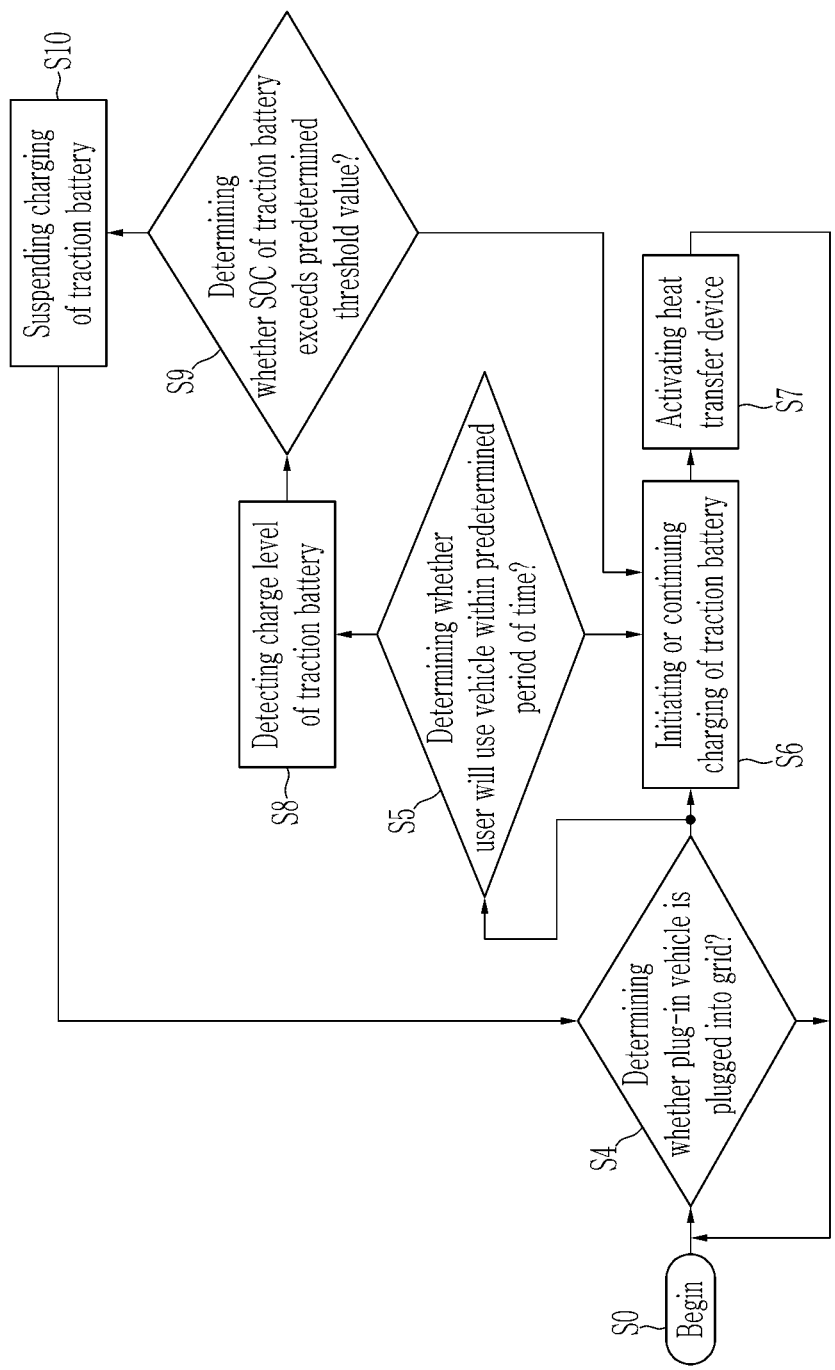
FIG. 8 shows a further flowchart of a process performed by the controller according to the exemplary embodiments of the invention.

FIG. 8 shows a further flowchart of a process performed by the controller according to the exemplary embodiments of the invention. The process begins at step S0, wherein when the controller 16 determines that the plug-in hybrid electric vehicle 2 is plugged into the grid then the process will continue to step S5. When the control device 16 determines that the plug-in vehicle is not plugged into the grid the process reverts back to step S4.

At step S5, the controller 16 may be configured to determine if a user will use the vehicle within a predetermined period of time, particularly within about 30 to 60 minutes. In response to determining that the vehicle will be used within the predetermined period of time, the process continues to step S6, in which the controller 16 may be configured to initiate or continue charging of the traction battery 15a and at the same time or consecutively, activate the heat transfer device 12; 14 at step S7.

Moreover, when the controller 16 determines that the plug-in hybrid electric vehicle 2 is plugged into the grid in step S4, and that a user will not use the vehicle within the predetermined period of time at step S5, the controller 16 may be configured to detect at step S8 a charge level of the traction battery 15a (e.g., a state of charge of the battery). The controller may then be configured to determine at step S9, if a state of charge of the traction battery 15a exceeds a predetermined threshold value of about 50%.

In response to determining that the battery state of charge exceeds the predetermined threshold value, the controller 16 may be configured to suspend charging at step S10 of the traction battery 15a until it is determined by the controller 16 that the user will use the vehicle within the predetermined period of time. If, on the other hand, the controller 16 determines that the state of charge of the charging battery 15a is less than the predetermined threshold value, the controller 16 may be configured to initiate or continue charging at step S6 of the traction battery 15a and at the same time or consecutively, activate the heat transfer system at step S7.

Figure 9:
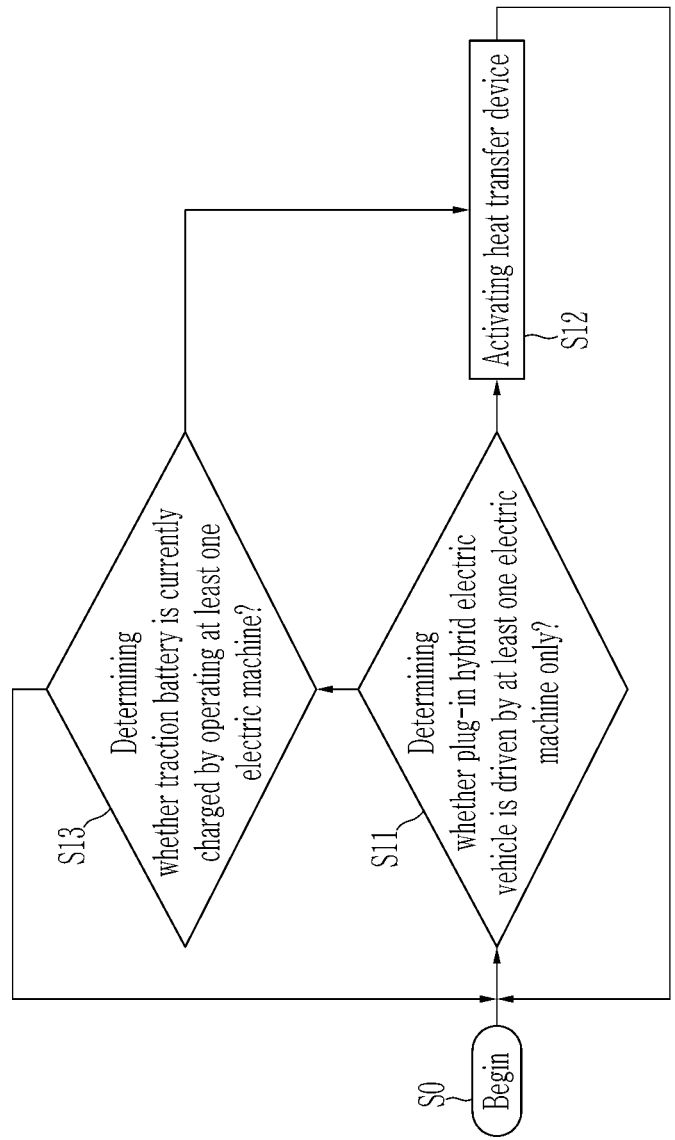
FIG. 9 shows a further flowchart of a process performed by the controller according to the exemplary embodiments of the invention.

FIG. 9 shows a further flowchart of a process performed by the controller according to the exemplary embodiments of the invention. The process begins at step S0, wherein if the controller 16 determines that the plug-in hybrid electric vehicle 2 at step S11 is driven by at least one electric machine 15c only, i.e. that an internal combustion engine of the vehicle 2 is currently not in use, the controller 16 may be configured to activate at step S12 the heat transfer device 12; 14.

Alternatively, if the controller determines that the plug-in hybrid electric vehicle 2 at step S11 is driven by the at least one electric machine 15c only and that the traction battery 15a of the plug-in hybrid electric vehicle 2 is currently charged by operating the at least one electric machine 15c at step S13 as a generator, the controller 16 may be configured to activate at step S12 the heat transfer device 12; 14. The controller may also be configured to set a timer to initiate charging the traction battery 15a such that charging of the traction battery 15a is complete when the user is estimated to use the plug-in hybrid electric vehicle 2. In particular, the controller 16 may be configured to estimate a point in time when the user will use the plug-in hybrid electric vehicle 2 based on e.g. usage pattern data recorded in a vehicle storage unit (e.g., a memory) or a cloud storage unit.

Although the afore-mentioned system and method for supplying heat to an exhaust gas after-treatment system of the plug-in hybrid electric vehicle has been described in connection to automobiles, a person skilled in the art is aware of the fact that the herein described system and method may be applied to other objects that are powered in the same fashion using an internal combustion engine and a plug-in electric system.

Although specific exemplary embodiments have been illustrated and described herein, it will be appreciated by those of ordinary skill in the art that a variety of alternate and/or equivalent implementations exists. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in the exemplary embodiments without departing from the scope as set forth in the appended claims and their legal equivalents. Generally, this application is intended to cover any adaptations or variations of the specific embodiments discussed herein.

REFERENCE LIST 1 system
2 plug-in hybrid electric vehicle
8 charging station
9 internal combustion engine
10 exhaust gas after-treatment system
12 convection heat transfer device
14 conduction heat transfer device
12a first circuit
12b second circuit
15 electric system
15a traction battery
15b inverter
15c electric machine
15d first inductive coil
15e second inductive coil
16 controller
17 inductive charging system

What is claimed is:

1. A system for supplying heat to an exhaust gas after-treatment system of a plug-in hybrid electric vehicle, comprising:
a heat transfer device configured to transfer heat generated by at least one component of an electric system of the plug-in hybrid electric vehicle to the exhaust gas after-treatment system of the plug-in hybrid electric vehicle, wherein the heat transfer device is a convection heat transfer device or a conduction heat transfer device; and
a controller configured to operate the heat transfer device.

2. The system according to claim 1, wherein the electric system includes:
a traction battery;
an inverter;
at least one electric machine; and
a charging system including an inductive coil.

3. The system according to claim 2, wherein the heat transfer device is configured to transfer heat generated by the at least one component of the electric system of the plug-in hybrid electric vehicle during charging or discharging the traction battery of the plug-in hybrid electric vehicle to the exhaust gas after-treatment system of the plug-in hybrid electric vehicle.

4. The system according to claim 3, wherein a first circuit of the convection heat transfer device containing a first fluid is configured to absorb heat from the at least one component of the electric system of the plug-in hybrid electric vehicle, and wherein a second circuit of the convection heat transfer device containing a second fluid is configured to absorb heat from the first circuit and transfer the heat to the exhaust gas after-treatment system of the plug-in hybrid electric vehicle.

5. The system according to claim 4, wherein the convection heat transfer device is configured to transfer heat generated by the traction battery during charging or discharging of the traction battery and to transfer heat generated by the inverter and the at least one electric machine during discharging of the traction battery to the inverter to drive the at least one electric machine.

6. The system according to claim 5, wherein the convection heat transfer device is configured to transfer heat generated by the charging system, during charging of the traction battery.

7. The system according to claim 1, wherein the conduction heat transfer device is disposed proximate to or abutting the traction battery and is configured to transfer heat during charging or discharging of the traction battery and to transfer heat by conduction generated by the inverter and the at least one electric machine during discharging of the traction battery to the inverter to drive the at least one electric machine.

8. The system according to claim 7, wherein the conduction heat transfer device is disposed proximate to or abutting the charging system, and is configured to transfer heat by generated by the charging system, during charging of the traction battery.

9. A method for supplying heat to an exhaust gas after-treatment system of a plug-in hybrid electric vehicle, comprising:
transferring, by a heat transfer device, heat generated by at least one component of an electric system of the plug-in hybrid electric vehicle to the exhaust gas after-treatment system of the plug-in hybrid electric vehicle, wherein the heat transfer device is a convection heat transfer device or a conduction heat transfer device; and
operating, by a controller, the heat transfer device.

10. The method according to claim 9, further comprising:
in response to determining that the plug-in hybrid electric vehicle is plugged in to the grid and if a user will use the vehicle within a predetermined period of time, initiating or continuing, by the controller, charging and activation of the heat transfer device.

11. The method according to claim 9, further comprising:

in response to determining that the plug-in hybrid electric vehicle is plugged in to the grid and that a user will not use the vehicle within a predetermined period of time, detecting, by the controller, a charge level of a traction battery; and determining, by the controller, if a state of charge of the traction battery exceeds a predetermined threshold value.

12. The method of claim 11, further comprising:

in response to determining that the state of charge of the traction battery exceeds the predetermined threshold value, suspending, by the controller, charging of the traction battery until it is determined that the user will use the vehicle within the predetermined period of time.

13. The method according to any one of claim 12, further comprising:

setting, by the controller, a timer to initiate charging a traction battery to complete charging of the traction battery when the user is estimated to use the plug-in hybrid electric vehicle.

14. The method according to claim 13, further comprising:

estimating, by the controller, a point in time when the user will use the plug-in hybrid electric vehicle based on usage pattern data recorded in a vehicle storage unit or a cloud storage unit.

15. The method according to claim 9, further comprising:

in response to determining that the plug-in hybrid electric vehicle is driven by at least one electric machine only, activating, by the controller, the heat transfer device.

16. The method according to claim 9, further comprising:

in response to determining that a traction battery of the plug-in hybrid electric vehicle is charged by operating at least one electric machine as a generator, activating, by the controller, the heat transfer device.

* * * * *